United States Patent [19]

Hodgdon et al.

[11] Patent Number: 5,284,879

[45] Date of Patent: Feb. 8, 1994

[54] HIGH ION EXCHANGE CAPACITY POLYELECTROLYTES HAVING HIGH CROSSLINK DENSITIES AND CAUSTIC STABILITY

[75] Inventors: Russell B. Hodgdon, Concord; Russell J. MacDonald, Watertown; Samuel S. Alexander, Concord, all of Mass.

[73] Assignee: Ionics, Incorporated, Watertown, Mass.

[21] Appl. No.: 857,910

[22] Filed: Mar. 26, 1992

Related U.S. Application Data

[62] Division of Ser. No. 479,491, Feb. 13, 1990, Pat. No. 5,118,717.

[51] Int. Cl.$^5$ ............................................. C08F 12/34
[52] U.S. Cl. ...................................... 521/27; 521/38; 526/303.1; 526/306; 526/310; 526/319; 564/281; 564/282; 564/290; 564/291
[58] Field of Search .................................... 521/38, 27

[56] References Cited

PUBLICATIONS

H. Ringsdorf et al., Makromol. Chem., 189, 299–315 (1988).

*Primary Examiner*—Joseph L. Schofer
*Assistant Examiner*—Fred Zitomer
*Attorney, Agent, or Firm*—Norman E. Saliba

[57] ABSTRACT

A water or alcohol-water soluble divinyl monomer having anion exchange group(s) and a free exchangable anion is disclosed. These bifunctional divinyl monomers are capable of forming ion exchange materials (membranes and ion exchange resin beads) upon polymerization with added vinyl catalysts which convert them into insoluble and infusible polymers. They are also capable of being co-polymerized with other ion exchange (ion containing) monomers to give unique anion exchange resins or membranes.

3 Claims, No Drawings

HIGH ION EXCHANGE CAPACITY POLYELECTROLYTES HAVING HIGH CROSSLINK DENSITIES AND CAUSTIC STABILITY

This application is a division of Ser. No. 07/479,491 filed Feb. 13, 1990 (U.S. Pat. No. 5,118,717).

BACKGROUND OF THE INVENTION

Historically, ion exchange resins (bead form) and ion exchange membranes have customarily been prepared by the co-polymerization of a divinyl monomer; such as non-polar, water insoluble divinylbenzene or ethylene glycol dimethacrylate (EGDM) with a monomer already containing ion exchange groups, such as 2-sulfoethyl methacrylate (2-SEM), or a monomer which after polymerization is convertible to contain ion exchange groups, such as styrene (convertible to sulfonated styrene) or dimethylaminopropylmethacrylamide (DMAPMA) (convertible to a quaternary ammonium halide after treatment with methyl chloride).

A technical difficulty often encountered is when one attempts to formulate a polymerizable mixture containing a non-polar (usually water insoluble), monomer containing multiple vinyl or groups; together with a highly polar (hydrocarbon insoluble) vinyl monomer such as the quaternized version of dimethylaminoethyl-methacrylate (DMAEMA).

The monomers cannot be blended together prior to polymerization because of differences in polarity. A case in point is the hopeless task of copolymerizing divinyl benzene with any quaternary ammonium halide acrylate or methacrylate monomer. It is not feasible to combine divinyl benzene and very polar ionogenic monomers with any solvent capable of supporting both monomers in suspension for the preparation of ion exchange beads. It doesn't matter whether or not the solvent is a water medium or organic non-polar medium; the two monomers will not co-polymerize to form ion exchange resin beads since they are incompatible.

Because of the incompatibility customarily found between hydrocarbon or other water insoluble crosslinking agents and ionogenic (ion containing) monomers already in possession of their ion exchange groups; it has been difficult to prepare ion exchange polymers having the desired properties of:

1) Selective ion exchange capacity (i.e. the synthetic luxury of adding a fixed mole fraction of ion exchange groups during the co-polymerization of network polyelectrolytes;
2) Chemical and physical stability by allowing the synthesis of a highly crosslinked polymer having ionogenic groups and also caustic or oxidative stable groups in desired quantities in the co-polymerized network polyelectrolyte polymer;
3) Gaining the advantage of having the crosslinker itself donating a portion of the ion exchange group concentration during polymerization;
4) Having an anion exchange resin bead or membrane having essentially all polymerized crosslinker without the need to chemically functionalize the finished crosslinked structures (via a post chemical reaction) which always tends to weaken the surface of the resin bead or membrane plane structures;
5) The preparation of highly crosslinked anion exchange membranes with very low water content. Such membranes are permselective to mineral acids (i.e. hydrochloric, nitric and sulfuric) and thus retain their permselective efficiencies for acids during the electrodialysis of salt acid mixtures. Such membranes are called acid efficient membranes;
6) The easy and fast preparation of mixed charge ion exchange resins (beads) or membranes having salt absorbing-desorbing properties. These are called ion-retarding resins or membranes.

OBJECTIVE AND SUMMARY OF THE INVENTION

It is an object of this invention to provide an improved permselective water-insoluble ion exchange polymer in a membrane and/or particulate (bead) form containing not only a desired quantity of ionogenic groups but having a uniform distributions of said groups within the polymerized network structure.

A further object is to provide an ion exchange polymer having one type of ion exchange group (for one purpose) attached to the crosslinking monomer and a fixed alternate variety (or type) of ion exchange or electron exchange group attached to the co-monomer.

Still another object of the invention is the preparation of very high anion exchange capacity resins (polymers) having a very high crosslink density (with simultaneous low water contents). These polymers thus achieve high conductivity when in membrane form or high exchange capacity when in bead or particular form; with good physical properties and excellent permselectivity due to the very high interstitial molality of the polyelectrolyte resin. Such a membrane would also be permselective to moderate concentrations of mineral acids and this would allow electrodialylic separation of acids and salts.

Yet another object of this invention is the creation of resins or membranes having polymeric structures and ion exchange groups attached that have physical or chemical resistance toward:

1) Chlorine oxidation.
2) Caustic degradation.
3) Organic fouling.
4) Theoretical surface polarization (in the case of ion exchange membranes) and
5) Donnan dialysis (lack of acid permselectivity).

A further object of this invention is to have ion exchange resins or membranes having a homogeneous blend of two or more different types of ionogenic groups (or ion exchange groups) for multipurpose use. This would include ion exchange sites even of opposite charge; it being understood that the crosslinking function would possess the anion exchange group in the polyelectrolyte structure of these inventions.

The novel polyelectrolytes described above are made possible by the direct preparation of a bifunctional ionogenic crosslinker prepared by the following general reaction:

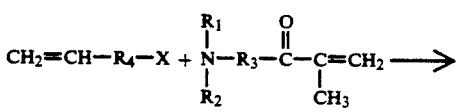

-continued

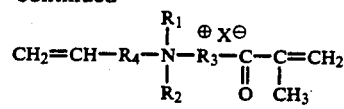

where
X=halogen group consisting of Cl, Br, or I.
$R_1$, $R_2$=methyl or higher alkyl group.
$R_3$=alkyloxy or alkylimino group.
$R_4$=benzyl or alkyl group.

The crosslinker is prepared in an aqueous or aqueous-polar solvent media. This (two vinyl group) anion exchange bifunctional crosslinker can be admixed with any polar anion or cation exchange vinyl monomer in the same aqueous solution. It matters not whether this monomer(s) phase is suspended in a water immiscible organic media and heated with catalyst to form ion exchange beads; or whether the aqueous phase containing the ionogenic crosslinker and free radical catalyst; as well as the polar ion exchange vinyl monomer are soaked onto a fabric support for the purpose of making an ion exchange membrane. When heat is applied to either, a complete co-polymerization will occur to form either:

1) A crosslinked anion exchange resin bead(s) containing ionogenic groups on both the crosslinker and on the mono vinyl monomer.
2) A crosslinked ion exchange membrane (preferably supported by a fabric) containing ionogenic groups on both the crosslinker and the mono vinyl monomer.
3) Either of the above created by polymerization of only the anion exchange bifunctional crosslinker.

The following examples are shown only for purposes of illustration and are not intended in any way to limit the invention:

EXAMPLE 1

A Divinyl Anion Exchange Crosslinking Monomer

In a 250 ml Erlenmeyer flask equipped with a magnetic stirrer system were placed 24 milliliters of dimethyl aminoethyl methacrylate (DMAEMA) an ionogenic methacrylate ester containing tertiary amine groups and 10 milliliters of distilled water. The magnetic stirrer was activated and a clear solution was obtained after 2 minutes of stirring. The flask plus contents was then immersed in a hot water bath to bring the solution up to between 40°-42° C.

This solution was then set back over the stirring magnet and stirring restarted whence 20 milliliters of vinyl benzyl chloride (VBC) was added dropwise, with stirring never allowing the mixture to exceed 45° C. After 15-20 minutes stirring, the solution cleared up and became slightly viscous. The conversion just described can be illustrated by the following reaction sequence to produce the divinyl quaternary ammonium monomer:

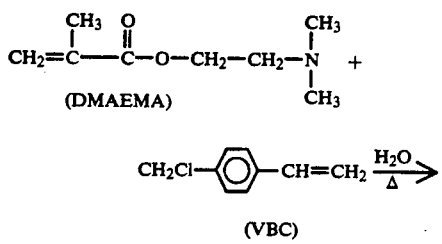

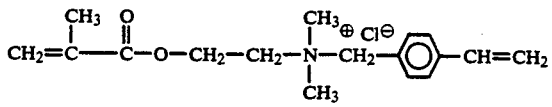
(CROSSLINKING MONOMER)

While still warm, 40 grams of a 75% solution of quaternized dimethylamino ethylmethacrylate (DMAEMA) in water (0.144 mol) was added to the resulting crosslinking monomeric solution with stirring as before to form a monomer solution mixture. The formula for quaternized DMAEMA is:

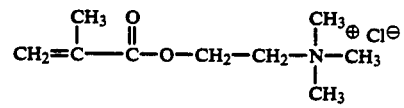

In a separate 50 ml beaker, 0.5 grams of the catalyst azo-bis-cyanovaleric acid is added to 5 ml of distilled water with one ml of tetraethylene pentamine until all is dissolved. This light yellow catalyst solution is added with stirring to the bulk monomer solution mixture contained in the 250 ml Erlenmeyer flask with continued stirring. The resulting solution is polymerized at 75°-80° C. around a continuously moving 5" wide fabric web sandwiched between polyester sheets so as to form, (at a rate of 1 to 3 inches per minute) a continuous one step ion exchange membrane reinforced by a fabric backing, which fabric may range in thickness from 5 to 20 mils.

The fully polymerized membrane has dimensions of 5"×21", which upon removal from its polyester sheet sandwich, gave an anion exchange polymeric membrane of the following properties after immersion in water:

Anion exchange capacity=3.32 milliequivalents Cl−/dry grm. resin

H2O (wet basis) =46.8%

Resistivity (1 KHZ in 0.01N NaCl)=6.5 ohm-cm² (130 ohm-cm)

Thickness =0.050 cm

Crosslink Formality =0.44 i.e. moles of divinyl compound to total moles of polymerizable compounds.

EXAMPLE 2

Optimum Crosslink Formality Polymeric Membrane

The membrane of this example has the highest attainable capacity with minimal water content. It is preferably used in electrodialysis for the separation of salts from un-ionized solutes (i.e. lactose and other low M.W. un-ionized organic molecules).

A mixture of DMAEMA and VBC was prepared as in Example 1 to form the divinyl monomer. Quaternized DMAEMA was not added to this mixture. The catalyst was then added and the resulting mixture polymerized as in Example 1 to form an anion exchange polymeric membrane of the following properties after immersion in water. The resulting polymer structure is:

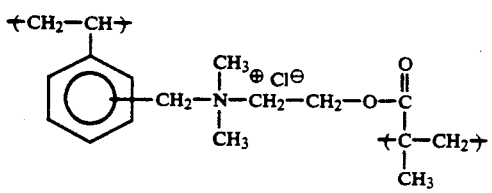

Anion exchange capacity = 2.74 milliequivalents Cl$^-$/dry gram resin
H$_2$O (wet basis) = 32.8%
Resistivity (1 kHz in 0.01N NaCl) = 8.1 ohm-cm$^2$
Thickness = 0.053 cm
Crosslink Formality = 0.890 (theoretical is 1.00)

EXAMPLE 3

A Base Stable Anion Exchange Membrane

In a 250 ml Erlenmeyer flask equipped with a magnetic stirrer system were placed 26 milliliters of dimethyl amino propyl methacrylamide (DMAPMA) (0.144 moles) having the formula:

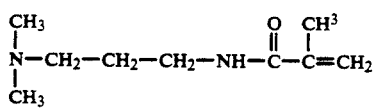

plus 10 milliliters of distilled water using a hot water bath to heat the solution to 40°–42° C. To this solution was added 20 milliliters of vinyl benzyl chloride (0.142 moles) dropwise with stirring while not allowing the temperature of the mixture to rise above 45° C. After total addition the mixture was stirred for 30 minutes at 40°–45° C. to create a clear light yellow solution of the following divinyl compound:

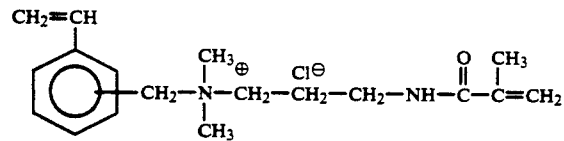

The resulting solution was cooled to room temperature and 60 milliliters of a commercial 50% aqueous solution of methacrylamido propyl trimethyl ammonium chloride, MAPTAC(0.144 moles) was added with stirring as represented by the formula:

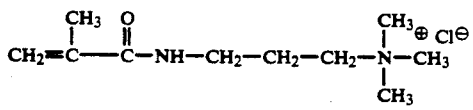

18 milliliters of N-methyl pyrrolidone was added to the resulting solution to clear up the mixture, then 5 milliliters of water, 1 ml of tetraethylene pentamine and 0.5 grams of the polymerization catalyst azo-bis cyanovaleric acid was added with further stirring. A homogeneous yellow clear solution resulted.

The above solution was vacuum treated at 2 mm Hg to remove air bubbles whence it was poured into a shallow tray. Between 5"×5" glass plates were sandwiched 18 mil thick acrylic fabric laid inside the tray containing the homogeneous solution. The filled tray was placed in an 80° C. oven overnight for 17 hours resulting in the polymerization of the liquid monomers in and around the fabric sheets sandwiched between the glass plates. The glass was stripped away and the resulting 5"×5"×21 mil thick membrane-fabric sheets were immersed in distilled water overnight.

The membrane-polymer structure and properties were as follows:

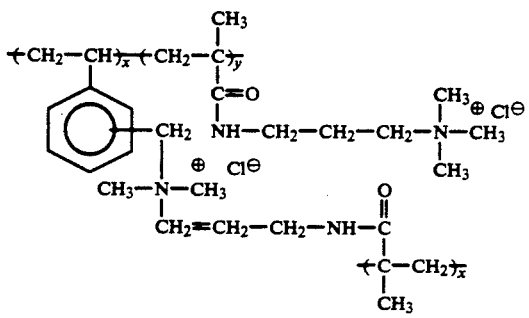

Theoretical anion exchange capacity = 3.68 Meq.Cl$^-$/dry gram resin
Actual Ion Exchange Capacity = 3.23 Meq.Cl$^-$/dry gram resin
Crosslink Formality = 0.49
Resistivity(1 k Hz in 0.01N NaCl) = 7.8 ohm-cm$^2$
Thickness = 0.055 cm
Water Content = 44.5% (Wet basis)

The dialkylaminoalkyl methacrylamide monomer used in this example is selected from those monomers represented by the formula:

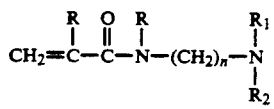

wherein R is hydrogen, methyl or ethyl; R$_1$ and R$_2$ are selected independently from the group consisting of methyl, ethyl and propyl and n is an integer from 1 to 4.

EXAMPLE 4

Stability of Ion Exchange Membrane to High Molarity Sodium Hydroxide

Five 3"×¾" sample of the membrane prepared in Example 3 were placed into 100 ml of 0.1N NaOH solution at 40° C. for evaluation of stability over time.

The following table (1) shows results of this test:

TABLE 1

| Membrane Sample | Days in NaOH (pH = 13) | Measured Capacity (Cl$^-$ Form) | % H$_2$O (Wet basis) | Resistivity (ohm-cm$^2$) |
|---|---|---|---|---|
| Original | 0 | 3.23 | 44.5 | 7.8 |
| 1 | 5 | 3.15 | 44.3 | 8.0 |
| 2 | 10 | 3.27 | 45.0 | 7.2 |
| 3 | 15 | 3.19 | 44.7 | 7.6 |
| 4 | 20 | 3.18 | 44.1 | 7.9 |
| 5 | 25 | 3.25 | 44.2 | 7.5 |

These results show little change in membrane properties, thus complete stability at least up to 25 days.

EXAMPLE 5

A Bifunctional Membrane Prepared from a Quaternary Ammonium Chloride Crosslinking Vinyl Monomer with Methacrylic Acid The divinyl crosslinking monomer (1:1 adduct) compound was prepared as in Example 3 and cooled to room temperature. A 50% aqueous solution containing 13 grams of methacrylic acid in 13 grams of water along with 0.2 grams of azo-bis cyanovaleric acid catalyst were added over a half hour period with stirring. The resultant cloudy solution was laid up in a glass-fabric sandwich tray as previously described in Example 3 and polymerized overnight at 70° centigrade. The polymerized membranes were removed from the glass plates and equilibrated with water containing enough sulfuric acid to give a pH of 3. The resulting membrane showed a capacity of the quarternary ammonium function of 2.16 Meq.Cl$^-$/dry gram resin and a crosslinking formality of 0.48.

Another membrane sample was placed into a saturated sodium bicarbonate solution for one hour and washed free of salt. A careful titration of the resulting carboxylate membrane sample showed a sodium ion exchange capacity of 1.72 Meq H$^+$/dry gram resin.

EXAMPLE 6

All Aliphatic, Foulant Resistant Anion Exchange Membrane for Use in Electrodialysis Process Exactly 27.1 ml (0.150 moles) of dimethylaminopropyl methacrylamide (DMAPMA) was dissolved in 60 ml of a 50% water solution of MAPTAC (0.144 molar in quaternary salt) in a 250 ml Erlenmeyer flask equipped with a stirrer. To this (at 35° C.) was added 7.6 milliliters (0.072 moles) of cis 1,4 dichloro 2 butene (ClCH$_2$CH=CH—CH$_2$Cl). The temperature rose to 40° C. The mixture was cooled in an ice bath whence a separate solution containing 0.5 grams of azo-bis cyanovaleronitrile in a 5 ml solution of water containing 1 milliliter of tetraethylene pentamine was added with stirring to the cool mixture. Upon cessation of stirring, a colorless and clear viscous solution was obtained.

This mixture was degassed at 2 mm Hg vacuum and a glassplate-acrylic fabric (18 mils) sandwich tray was filled with the mixture and cured overnight (17 hours) at 80° C. as done in Example 3. The polymerization tray was taken apart and the membranes stripped from their glass plates and immersed in water.

The reaction sequence and the resulting theoretical polymer structure follows:

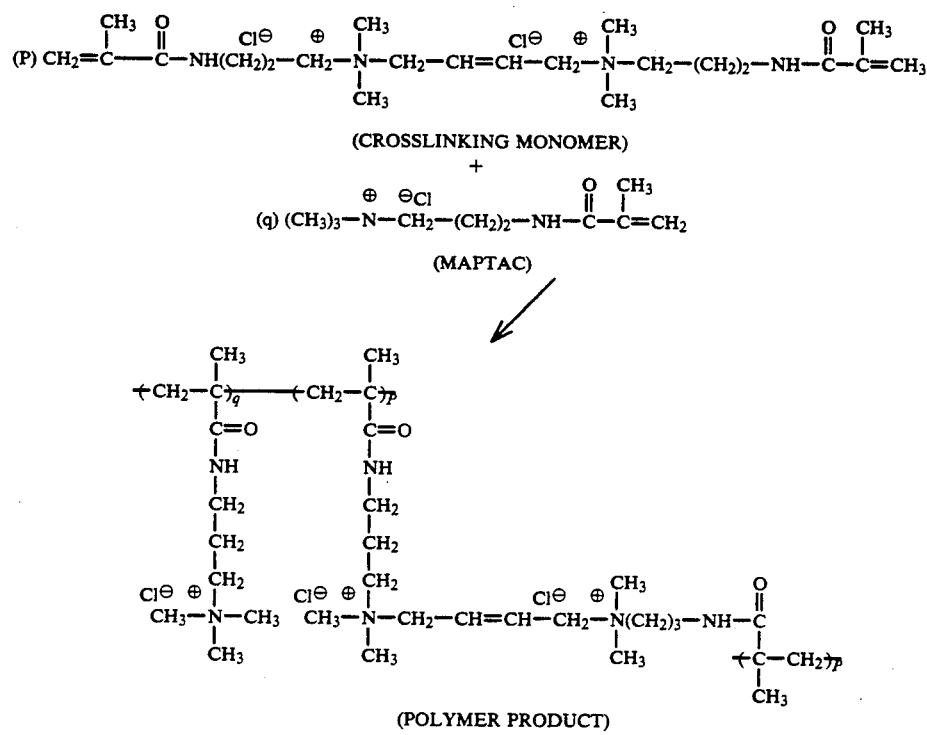

(POLYMER PRODUCT)

Theoretical properties:
Ion-exchange capacity (IEC) = 4.38 Meq. Cl$^-$/dry gm. resin
Crosslink Formality = 0.50
Actual properties found:
IEC = 3.52 mleq. Cl$^-$/dry gm. resin
H$_2$O = 51.6%
Resistivity = 8.9 ohm-cm$^2$
Thickness = 0.055 cm A sample of the above anion exchange membrane was placed in an electrolytic cell as the ion exchange barrier between the anolyte and catholyte chambers. Both chambers were filled with a 0.01N NaCl solution with the catholyte chamber also containing 0.5% of the membrane foulant sodium humate. A direct current was applied across the end positioned electrodes to determine the time required to foul the membrane, i.e. when the cell voltage increased to 1.0 volts from an initial voltage of 0.3 volts. The cell operated for better than 60 minutes without having reached the 1.0 volt fouling point.

For comparison, a commercial type styrene/divinylbenzene anion exchange membrane was placed in the cell and operated in the same manner. In this case the membrane fouled rapidly as evidenced by the 1.0 voltage reading after only fourteen minutes of operation.

EXAMPLE 7

Sodium Hypochlorite Tolerance of Membranes

Samples of the membranes prepared in examples #2 and 3 were placed into a diluted commercial bleach solution containing 1000 ppm NaOCl (a measured hypochlorite concentration of 1065 ppm). The pH of the solution was adjusted to 6.0±0.1 with 2N hydrochloric acid. The bleach solution was replaced with fresh solution every 3 days over a 9 day period. Membrane properties measured as follows:

| Membrane | Hrs. in soln. | Resistivity ~--cm$^2$ 0.01 N NaCl at 1 Hz | Capacity Meq. Cl$^-$/ gm resin | % H$_2$O | (ppm hypochlorite) times (hrs.) |
| --- | --- | --- | --- | --- | --- |
| Example #2 | 0 | 8.1 | 2.74 | 32.8 | 0 |
|  | 72 | 8.0 | 2.78 | 32.4 | 72000 |
|  | 144 | 8.6 | 2.66 | 34.0 | 144000 |
|  | 216 | 8.5 | 2.64 | 38.2 | 216000 |
| Example #3 | 0 | 7.8 | 3.23 | 44.5 | 0 |
|  | 72 | 7.6 | 3.11 | 43.6 | 72000 |
|  | 144 | 7.9 | 3.08 | 46.4 | 144000 |
|  | 216 | 8.0 | 2.89 | 49.2 | 216000 |

At the end of the test the surfaces of the membranes were substantially unchanged. The membranes remained usable and still possessed good physico-chemical properties. These membranes are therefore useful in electrodialysis desalting in the presence of small quantities of bleach (0.1 to 0.5 ppm) at neutral pH's.

Accordingly, since certain changes may be made without departing from the scope of the invention herein involved, it is intended that all matter contained in the above description shall be interpreted as illustrative and not in a limiting sense.

We claim:

1. An ion exchange membrane having at least one dimension in excess of ¼ inch comprising a polymerizate of at least a quaternary ammonium salt having the formula:

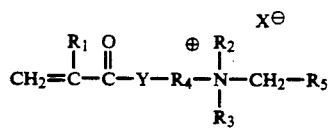

where
$R_1$ is hydrogen or an alkyl moiety,
$R_2$ is an alkyl moiety,
$R_3$ is an alkyl moiety,
$R_4$ is an alkyl moiety,
$R_5$ is a moiety containing at least one polymerizable ethylenic group,
$X^\ominus$ is an anion,
Y is —O— or

and where $R_6$ is hydrogen or an alkyl group, the sum of the formula weights of $R_2$ and $R_3$ being less than 500 and the molecular weight of said quaternary ammonium salt being less than 800.

2. An ion exchange membrane comprising of polymerizate of at least:

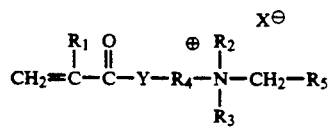

where
$R_1$ is hydrogen or an alkyl moiety,
$R_2$ is an alkyl moiety,
$R_3$ is an alkyl moiety,
$R_4$ is an alkyl moiety,
$R_5$ is vinyl phenyl,
$X^-$ is an anion,
Y is —O— or

and where $R_6$ is hydrogen or an alkyl group.

3. An ion exchange membrane comprising a polymerizate of at least:

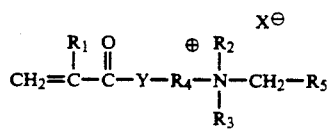

where
$R_1$ is hydrogen or an alkyl moiety,
$R_2$ is an alkyl moiety,
$R_3$ is an alkyl moiety,
$R_4$ is an alkyl moiety,
$R_5$ is

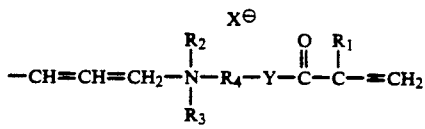

$X^\ominus$ is an anion
Y is —O— or

and where $R_6$ is hydrogen or an alkyl group.

* * * * *